United States Patent [19]

Courtabessis et al.

[11] Patent Number: 6,101,762
[45] Date of Patent: Aug. 15, 2000

[54] SOIL COVERING MEDIUM OF THE MULCH TYPE OR THE LIKE

[75] Inventors: Pascal Courtabessis; Stephane Courtabessis, both of Landiras, France

[73] Assignee: Courtabessis Capital Consulting Societe A Responsabilite Limitee, Landiras, France

[21] Appl. No.: 09/127,035

[22] Filed: Jul. 31, 1998

[30] Foreign Application Priority Data

Aug. 13, 1997 [FR] France .................................. 97 10491

[51] Int. Cl.$^7$ ................................................ C09K 17/52
[52] U.S. Cl. ................................................ 47/9; 119/172
[58] Field of Search ........................ 47/9; 71/23; 119/172

[56] References Cited

U.S. PATENT DOCUMENTS

| | | | |
|---|---|---|---|
| 3,645,714 | 2/1972 | Heming et al. | 71/23 |
| 3,881,278 | 5/1975 | Videen | 47/9 X |
| 4,154,174 | 5/1979 | Rees, Jr. et al. | 47/9 |
| 4,232,480 | 11/1980 | Videen | 47/9 |
| 4,250,662 | 2/1981 | Rees et al. | 47/9 |
| 4,253,273 | 3/1981 | Rees, Jr. et al. | 47/9 |
| 4,369,597 | 1/1983 | Leep et al. | 47/9 |
| 4,900,010 | 2/1990 | Wengmann et al. | 47/1.01 R |
| 4,932,156 | 6/1990 | Underwood | 47/9 |
| 5,087,400 | 2/1992 | Theuveny | 47/64 X |
| 5,114,457 | 5/1992 | Evans | 71/23 |
| 5,301,460 | 4/1994 | Corbitt | 47/9 |
| 5,307,588 | 5/1994 | Ullmann | 47/9 |
| 5,443,612 | 8/1995 | Havens | 71/23 X |
| 5,458,662 | 10/1995 | Toyone | 47/9 X |
| 5,709,729 | 1/1998 | Mitchell | 71/23 X |
| 5,779,782 | 7/1998 | Spittle | 47/9 X |
| 5,853,541 | 12/1998 | Monroe et al. | 47/9 X |

FOREIGN PATENT DOCUMENTS

| | | |
|---|---|---|
| 2092963 | 10/1994 | Canada . |
| 42 00 855 | 7/1993 | Germany . |
| 2 261 215 | 5/1993 | United Kingdom . |

*Primary Examiner*—Michael J. Carone
*Assistant Examiner*—Jeffrey L. Gellner
*Attorney, Agent, or Firm*—Young & Thompson

[57] ABSTRACT

A soil covering medium of the mulch type or the like, constituted by vegetable fibers having a cumulative weight of lignin and resin greater than or equal to about 25% by weight relative to the dry weight of the fibers and a length greater than or equal to about 0.5 mm as to at least about 70% of the fibers, the fibers being formed of individual filaments or fibrils.

9 Claims, No Drawings

SOIL COVERING MEDIUM OF THE MULCH TYPE OR THE LIKE

CROSS REFERENCE TO RELATED APPLICATION

This application corresponds to French application 97 10491 of Aug. 13, 1997, the disclosure of which is incorporated herein by reference.

1. Field of the Invention

The present invention relates to media for covering the soil and more particularly to those of the mulch type or the like.

2. Background of the Invention

Such covering media are adapted to fulfill several functions and the various media used at present are most often for specific purposes.

Generally speaking, they serve principally to maintain heat or humidity in the soil, but other functions are also sought.

Certain ones, such as thin sheets of plastic material, are spread over seed beds or at the foot of trees, bushes or plants. They also have the function of providing a lightened air screen and thus to prevent the aerial development of undesired vegetation.

Other ones, such as straw, dried leaves, conifer bark, etc . . . are constituted of distinct elements, juxtaposed in bulk over a variable thickness. They are needed randomly and to various degrees, to regulate the exchanges between the soil and the air, to reduce surface evaporation, to constitute moisture reserves, to store heat of solar origin, to reduce thermal loss, to restrict the access of air and moisture to the upper layer of the soil so as to reduce or prevent the development of undesired vegetation, or again to place fruits out of contact with the ground, melons for example, to avoid soiling.

More and more, and as is the case particularly for conifer bark, they are also used for aesthetic purposes, because they improve the neatness, the cleanliness, and the decoration of the environment, such media being employed essentially in urban settings, in public spaces, as well as on private property.

In this usage, there are required of these covering media a certain number of properties of which certain ones can be difficult to achieve, or even contradictory, and moreover are required increasingly to preserve these properties with time.

In particular, as to conifer bark, the useful life of such covering medium is short and transitory, because particularly of the highly dispersible character of bark fragments, because of the mechanical actions from various origins (rainfall, birds and other animals).

There is unfortunately no covering medium which will be ideal and aesthetic and permanent, having all these properties, associated moreover with a low market price and which will be easy to produce, store, handle and emplace.

SUMMARY OF THE INVENTION

The present invention relates principally to this type of soil covering medium and seeks to propose a medium having a substantially greater number of advantageous properties and adapted to the desired end, than present media adapted for the same use.

To this end, the invention has for its object a soil covering medium of the mulch type or the like, characterized in that it is constituted of vegetable fibers having a total lignin and resin content greater than or equal to about 25% relative to the dry weight of the fibers and a length greater than or equal to about 0.5 mm as to at least about 70% of the fibers, these latter being comprised by individual filaments or fibrils.

Preferably, said fibers are used in bulk and have moreover a puff greater than or equal to about 60 mm, measured in height from a cylinder of fibers of constant cross section, not subjected to pressure, the fibers being in an air dried condition.

Soil coverings using fibers having the particularities or properties above have in common, in addition to excellent capacities, particularly for production of soil, for regulation of soil-air gas exchanges, for water absorption, for light shielding, a very good cohesion which together with the perennial character of the puff of the fibers, ensures a quite remarkable lifetime for these coverings which can thus, for a period of time much longer than the present soil coverings adapted for the same uses, give their full performance.

The fibers adapted for such uses are moreover easy to obtain in a relatively economical manner and are very easy to use, particularly as to their emplacement on the surface to be covered, manually or by machine for example, because the fibers, when in bulk, are present in the form of a tangled mass of fibers.

DETAILED DESCRIPTION OF THE INVENTION

There will now be described in greater detail the best soil coverings according to the invention, in particular from tests and measurements of various physico-chemical characteristics of several types of fibers adapted or not to be used according to the invention.

In Table 1 hereafter are reported measurements of physico-chemical characteristics, on the one hand, of cluster pine fibers, of scotch pine fibers, of coconut fibers, all these fibers being adapted for the production of soil coverings or mulch which are stable and effective and, on the other hand, of broad leaf fibers (a mixture of oak and chestnut), of green flax fibers, of processed flax fibers, of glass wool and of rock wool, which are not suitable.

TABLE 1

|  | Unscreened Cluster Pine Fibers | Unscreened Scotch Pine Fibers | Broad Leaf Fibers (oak and chestnut) Unscreened | Coconut Fibers | Green Flax Fibers | Refined Flax Fibers | Glass Wool | Rock Wool |
| --- | --- | --- | --- | --- | --- | --- | --- | --- |
| Dryness (%) | 57.14 | 82.88 | 75.51 | 89.65 | 85.41 | 90.61 | 96.88 | 98.57 |
| Resin Content | 2.38 | 0.83 | 0.96 | 0.27 | 0.77 | 0.50 | n.d. | n.d. |

TABLE 1-continued

| | Unscreened Cluster Pine Fibers | Unscreened Scotch Pine Fibers | Broad Leaf Fibers (oak and chestnut) Unscreened | Coconut Fibers | Green Flax Fibers | Refined Flax Fibers | Glass Wool | Rock Wool |
|---|---|---|---|---|---|---|---|---|
| (% relative to the dry weight of the fibers) Resin Acids | 0.76 | 0.25 | 0.01 | 0 | 0 | 0 | 0 | 0 |
| (% relative to the dry weight of the fibers) Free Fatty Acids (% relative to the dry weight of the fibers) | 0.08 | 0 | 0.02 | 0.02 | 0.06 | 0.05 | 0 | 0 |
| Lignin Content (% relative to the dry weight of the fibers) | 29.56 | 28.5 | 25.06 | 38.34 | 2.84 | 1.93 | n.d. | n.d. |
| Puff (Air dried fibers) (height in mm) | 97.5 | 88.0 | 33.5 | 101 | 97.5 | 106.5 | 120.5 | 47.0 |
| Specific Volume $cm^3$ of Dried Fibers | 34.1 | 30.69 | 11.7 | 35.46 | 35.58 | 36.64 | 38.77 | 14.86 |
| Specific Volume $cm^3/g$ of Dried Fibers | 35.0 | 30.26 | 11.7 | 35.37 | 46.2 | 48.6 | n.d. | n.d. |
| L Fibers > 1.18 mm | 47.70 | 56.50 | 36.70 | 71.68 | 86.69 | 89.27 | 18.80 | 20.12 |
| 0.5 mm < L Fibers > 1.8 mm | 26.60 | 20.10 | 12.50 | 7.55 | 0.83 | 0.89 | 20.86 | 27.78 |
| 0.3 mm < L Fibers > 0.5 mm | 11.60 | 9.90 | 11.80 | 6.87 | 0.89 | 0.40 | 18.37 | 20.73 |
| 0.15 mm < L Fibers > 0.3 mm | 3.40 | 3.90 | 10.80 | 3.98 | 0.52 | 0.30 | 30.30 | 15.61 |
| Loss < 0.15 mm | 10.7 | 9.6 | 28 | 10.72 | 11.07 | 9.14 | 11.67 | 15.76 |

As a result of tests it was determined that the fibers of cluster pine, scotch pine and coconut, whose studied physico-chemical characteristics are reported in Table 1, had a behavior when applied as a soil covering, which was remarkable as to the following properties, the fibers being disposed in bulk in a continuous layer of 5–8 centimeters: suitable density neither too high nor too low ensuring a good control of gas exchanges and a good shielding from light, high capacity for water absorption and above all good cohesion between the fibers which have a greater tendency to remain in their initial entangled state than conventional mulches, without too much packing, nor too much scattering with time and/or because of external agents such as bad weather (wind, rain, trickling water) or animals (birds, dogs, cats, etc . . . ).

It has thus been observed that the fibers remain grouped as though bound together and that this binding effect seems to have as its cause in the first instance the substantial presence of lignin, but also, for the resinous fibers particularly, the substantial presence of resin.

A total weight of lignin and of resin in the fibers greater than or equal to about 25% relative to the weight of the dry fibers, thus appears to be one of the determining criteria for use of the fibers as mulch or the like, according to the invention.

In Table 1 it will be noted that the cluster pine fibers, scotch pine fibers and coconut fibers have a total weight of lignin and resin higher than 25%.

As to the coconut fibers, the very reduced resin content is compensated by their much higher content of lignin than the resinous ones.

Another determining criterion in the use of vegetable fibers according to the invention is the length of the fibers which must be greater than or equal to about 0.5 mm for at least 70% of the fibers.

In Table 1, the fiber lengths, determined according to the CLARK standard classification protocol and expressed in percentage of all the fibers, show that this criterion is satisfied for cluster pine fibers, scotch pine fibers and coconut fibers.

The resinous and broad leafed fibers which are the object of tests and measurements reported in Table 1 come directly from mechanical defibering between two screws without steam and have not been subjected to screening. It is evident that screening of these fibers would further improve the percentage of fibers of a length greater than 0.5 mm.

It is to be noted that the broad leafed fibers, though having a cumulative weight of lignin and resin slightly greater than 25%, are not adapted for use as mulch because the fibers are too short. The fibers tested came directly from the same mechanical defibering as the other fibers.

As indicated in Table 1, the proportion of the broad leafed fibers of a size less than 0.3 mm is nearly 40%, with 28% of fibers below 0.15 mm or in a powdered state.

With the fibers of a length very substantially less than 0.5 mm, there is observed poor durability of the mulch layer which is too packed and lacks cohesion, which is to say is subject to dispersion.

The puff of the fibers which can be defined as the capacity of the fibers to occupy, in an uncompressed state, a more or less free volume, is also good criterion of selection for use as mulch. The puff is connected to an interaction of the fibers whose length is evidently determinate. The longer the fibers and the greater will the puff be important.

The puff is conventionally determined by the measurement of the height of a "cylinder of fibers" of constant cross section not subjected to pressure. In Table 1, the puff is measured with air dried fibers.

A puff greater than or equal to 60 mm is considered as desirable for use in bulk of the fibers according to the invention.

In Table 1 it will be seen that the cluster pine fibers, the scotch pine fibers and the coconut fibers also satisfy this criterion.

The broad leafed fibers on the contrary no longer satisfy this criterion.

The other fibers (flax, glass wool or rock wool), subjected to tests do not satisfy in particular the central criterion of the cumulative content of lignin and resin and cannot serve as mulch or the like in spite of the possible satisfaction of the criterion of length of the fibers (in the case of green flax or refined flax) and the satisfaction of the criterion of puff (in the case of flax and glass wool). It is to be noted in this connection that the glass wool has by far the best puff, probably due to its electrostatic properties.

However, this puff is not permanent because it does not return after packing whilst in the resinous and coconut fibers tested, the puff is permanent in the sense that it returns substantially to the initial state after packing, the layer of mulch possessing certain elasticity which is quite interesting from the standpoint of permanence of the mechanical properties of the mulch.

It is to be noted that this property of puff of the fibers used according to the invention is to be seen only when said fibers are used in bulk, which is to say that they are swollen, unagglomerated and uncompressed.

According to another mode of use of the invention, the fibers can be produced in plates or in rolled strips, deposited or unrolled on the ground. To this end, the fibers are deposited in the form of a bed of tangled, compressed or agglomerated fibers, a woven armature particularly with large meshes being integrated into this bed.

The non-satisfaction of the criterion of cumulative weight of lignin and resin excludes the usage as mulch, because of too great instability, dispersibility and too rapid loss of mechanical properties.

It has also been observed that the cohesion between fibers in a mulch with resinous fibers is greater and would be due to the presence of resin acids which give rise to better hooking between the fibers.

In Table 1 it will be noted that for fibers of cluster pine and fibers of scotch pine, the proportion in the resin of resin acids relative to the free fatty acids (both expressed in Table 1 in percentage relative to the dry weight of the fibers) is much greater.

As to resinous fibers tested, there has also been noted a particular effect analogous to crusting of the surface of the mulch produced with these fibers.

Thus, the exposure to light and air of the resinous fibers gives rise to the rapid formation of a thin surface layer in which the fibers are more interconnected in comparison with the fibers below them.

This phenomenon of "crusting" seems to be due to the presence of the combined lignin and fatty acids.

A spectroscopic mass analysis of a specimen of the "crust" showed degradation of the lignin.

The "crust" has moreover much less resin acid and free fatty acid than the fibers below them.

In Table 2 hereafter, there are collected the measured values of the resin, resin acid and free fatty acid contents, expressed in percentage relative to the dried fibers, of cluster pine fibers from the crust and below this latter, respectively.

TABLE 2

|  | FIBERS OF CLUSTER PINE (BELOW) | FIBERS OF CLUSTER PINE (CRUST) |
| --- | --- | --- |
| Resin Content | 1.85 | 1.38 |
| Resin Acids | 0.74 | 0.13 |
| Free Fatty Acids | 0.27 | 0.05 |

The modifications of the fatty acids and resin acids in the crust can be explained particularly as a consequence of the thermal treatment undergone by the fibers during defibering.

The invention covers the use as a soil covering, of the mulch type or the like, of resinous and coconut fibers whose tests have been given above, and also any fiber of vegetable origin satisfying at least the two criteria of combined weight of lignin and resin, and fiber length, set forth above.

The fibers are used according to the invention as they leave the obtention process, preferably a mechanical defibering as to the essentially resinous fibers, according to one of the known techniques used in paper making or in the wood fiber board industry.

In particular, the fibers coming directly from defibering of this latter industry can be, after draining and possible screening, used as such as soil covering.

In addition to the a disc defibrator which use defibering in a steam atmosphere, other devices such as dried defibering screws, permit obtaining fibers that can be used, the fibers being screened if desired.

According to another aspect of the invention, and for aesthetic purposes, the fibers usable as mulch or the like can be if desired colored, particularly in the mass, by any suitable technique and in any color, thereby giving the user the possibility of creating variegated color compositions, adapted to the surroundings, which is to say as well to the vegetation as to the adjacent objects or surfaces.

Finally, the fibers used according to the invention can be supplemented by various additives that are phytosanitary, nutritive, repulsive to certain animals for example, etc., even perfumed additives.

What is claimed is:

1. Soil covering medium consisting essentially of vegetable fibers having a cumulative lignin and resin content of at least about 25% by weight relative to the dry weight of the fibers and a length of at least about 0.5 mm for at least about 70% of the fibers, said fibers being formed by individual filaments or fibrils.

2. Medium according to claim 1, wherein said fibers are used in bulk and have a puff of at least about 60 mm, measure in the height of a cylinder of fibers of constant cross section, not subjected to pressure, the fibers being in an air-dried condition.

3. Medium according to claim 1, wherein said fibers are in the form of plates or rolled strips, and are in the form of a bed of entangled, compressed or agglomerated fibers, having a woven armature in said bed.

4. Medium according to claim 1, wherein said fibers are resinous and of pine.

5. Medium according to claim 4, wherein said fibers are from mechanical defibering processes and are screened before use.

6. Medium according to claim 5, wherein said fibers are from a disc defibrator in a steam atmosphere and are used as such after draining.

7. Medium according to claim 1, wherein said fibers are coconut fibers.

8. Medium according to claim 1, wherein said fibers are colored in the mass.

9. Medium according to claim 1, wherein said fibers are supplemented by additives to be at least one of phytosanitary, nutritive, repulsive and perfumed.

\* \* \* \* \*